(12) United States Patent
Geer

(10) Patent No.: US 10,883,266 B2
(45) Date of Patent: Jan. 5, 2021

(54) ACOUSTIC PANEL

(71) Applicant: GeerFab LLC, Milwaukee, WI (US)

(72) Inventor: Eric Geer, Milwaukee, WI (US)

(73) Assignee: GeerFab LLC, Milwaukee, WI (US)

( * ) Notice: Subject to any disclaimer, the term of this patent is extended or adjusted under 35 U.S.C. 154(b) by 0 days.

(21) Appl. No.: 16/297,286

(22) Filed: Mar. 8, 2019

(65) Prior Publication Data

US 2019/0203462 A1 Jul. 4, 2019

Related U.S. Application Data

(63) Continuation of application No. PCT/US2017/038176, filed on Jun. 19, 2017.

(60) Provisional application No. 62/385,638, filed on Sep. 9, 2016.

(51) Int. Cl.
| | |
|---|---|
| *E04B 1/86* | (2006.01) |
| *B32B 27/12* | (2006.01) |
| *B32B 27/34* | (2006.01) |
| *E04B 1/82* | (2006.01) |

(52) U.S. Cl.
CPC ............... *E04B 1/86* (2013.01); *B32B 27/12* (2013.01); *B32B 27/34* (2013.01); *B32B 2262/101* (2013.01); *B32B 2307/102* (2013.01); *B32B 2419/00* (2013.01); *E04B 2001/8263* (2013.01); *E04B 2001/8281* (2013.01)

(58) Field of Classification Search
CPC . B32B 2307/102; B32B 2607/00; E04B 1/86; E04B 2001/8452; E04B 2001/8461; E04B 2001/8263; E04B 1/8209; E04B 2307/102; E04B 2607/00
See application file for complete search history.

(56) References Cited

U.S. PATENT DOCUMENTS

| | | | | |
|---|---|---|---|---|
| 2,764,765 A | * | 10/1956 | Woodruff, Sr. | ......... B63B 17/02 114/361 |
| 4,057,123 A | | 11/1977 | Erickson | |
| 4,702,046 A | | 10/1987 | Haugen et al. | |

(Continued)

FOREIGN PATENT DOCUMENTS

| | | |
|---|---|---|
| DE | 10230294 A1 | 2/2003 |
| WO | WO2005113238 | 12/2005 |

OTHER PUBLICATIONS

International Preliminary Report on Patentability for International Application No. PCT/US2017/038179, dated Mar. 21, 2019, 12 pages.

(Continued)

*Primary Examiner* — Brian E Glessner
*Assistant Examiner* — Daniel J Kenny
(74) *Attorney, Agent, or Firm* — Reinhard Boerner Van Deuren P.C.

(57) ABSTRACT

An acoustic panel is provided. The acoustic panel may include a hidden mounting structure formed on the rear surface of the acoustic panel. The hidden mounting structure allows the acoustic panel to be used with substrates of any density, including substrates with a medium density of greater than 2 lbs. per cubic foot (pcf) and less than 6 lbs. pcf. In one particular embodiment, the acoustic panel may be used with substrates having a density of approximately 3 lbs. pcf. The acoustic panel may also include a cover formed from two or more materials having different acoustical and/or physical properties.

8 Claims, 13 Drawing Sheets

(56) References Cited

U.S. PATENT DOCUMENTS

| | | | | | |
|---|---|---|---|---|---|
| 4,741,945 | A | * | 5/1988 | Brant | B32B 5/18 428/158 |
| 4,744,189 | A | * | 5/1988 | Wilson | B44C 1/28 40/908 |
| 4,819,680 | A | * | 4/1989 | Beavers | E04H 15/32 135/119 |
| 5,255,765 | A | * | 10/1993 | Schrecongost | A45C 13/002 150/154 |
| 5,584,599 | A | * | 12/1996 | Knittel | E02B 3/108 383/18 |
| 5,860,251 | A | * | 1/1999 | Gleich | A62C 3/0257 52/2.18 |
| 6,073,643 | A | * | 6/2000 | Zheng | A63B 9/00 135/125 |
| 6,519,782 | B2 | * | 2/2003 | Collins | A41D 13/0158 2/463 |
| 6,837,764 | B2 | * | 1/2005 | Bradley | B63C 9/1255 441/106 |
| 8,082,696 | B2 | * | 12/2011 | Oliver | B32B 3/04 267/142 |
| 8,739,924 | B2 | * | 6/2014 | Johnson | E04B 1/86 181/284 |
| 2004/0226254 | A1 | * | 11/2004 | Charlwood | E04C 3/07 52/834 |
| 2005/0257446 | A1 | * | 11/2005 | Wolner | A62B 35/0068 52/127.1 |
| 2007/0193137 | A1 | * | 8/2007 | DeBoth | E06B 9/02 52/202 |
| 2008/0307737 | A1 | * | 12/2008 | Pirogovsky | F16L 59/168 52/506.02 |
| 2013/0161126 | A1 | | 6/2013 | Wilson et al. | |
| 2014/0262603 | A1 | | 9/2014 | Johnson | |
| 2016/0130800 | A1 | * | 5/2016 | Williams | E04B 9/003 52/506.01 |
| 2017/0347621 | A1 | * | 12/2017 | Jeddry | A01K 1/0157 |

OTHER PUBLICATIONS

Hal Leonard website material, Multizorber, htt://www.halleonard.com/search/search.action?keywords=multizorber&subsiteid=1&, showing products publically available before Sep. 9, 2016, 1 page.

GeerFab Acoustics website material, ProZorber, https://geerlab.com/prozorber/, showing products publically available at least by Feb. 13, 2016, 5 pages.

Guilford of Maine website material, Acoustic, https://www.guilfordofmaine.com/acoustic?page=2 , showing products publically available before Sep. 9, 2016, 70 pages.

MBI Products website material, Cloud-Lite Acoustical Baffles, http://mbiproducts.com/products/cloud-lite/2800S-2030-GF/, information as of Sep. 6, 2019, 1 page.

Sound Video Contactor website article, "Technology Showcase: Sound Masking & Acoustical Products", http://mbiproducts.com/products/cloud-lite/2800S-2030-GF/, Jun. 7, 2017, 10 pages.

* cited by examiner

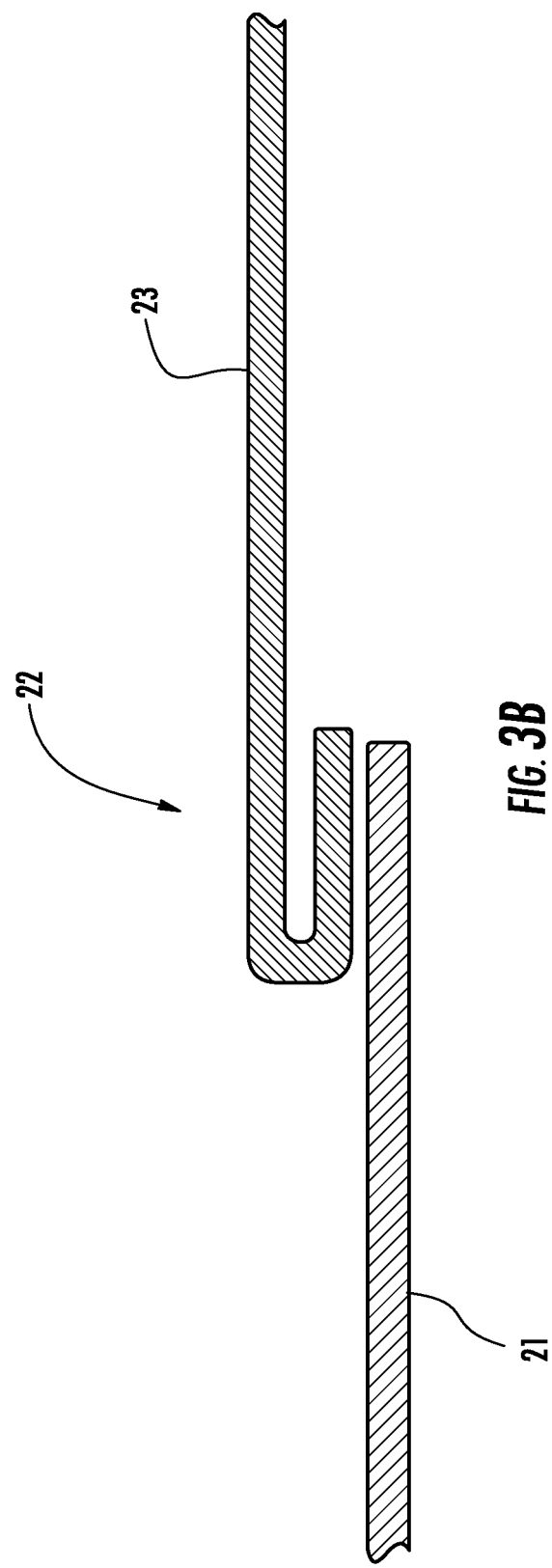

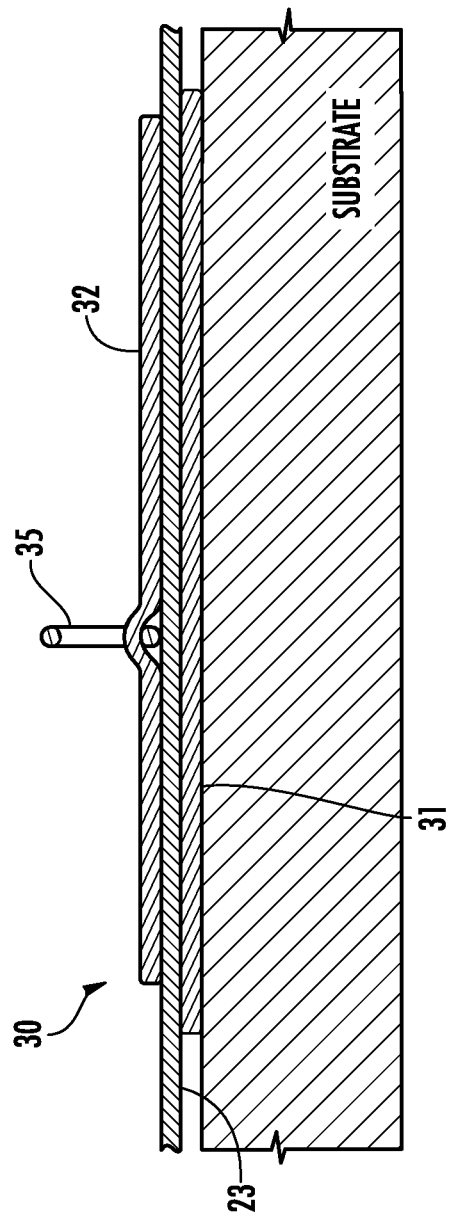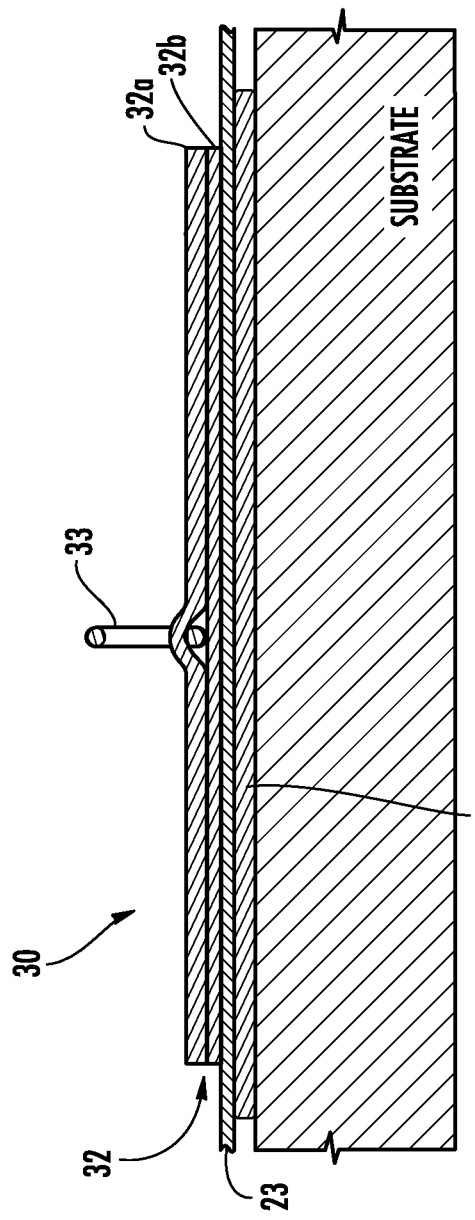

ACOUSTIC PANEL

CROSS-REFERENCE TO RELATED PATENT APPLICATION

This application is a continuation of International Application No. PCT/US2017/038176, filed Jun. 19, 2017, which claims the benefit of and priority to U.S. Provisional Application No. 62/385,638, filed Sep. 9, 2016, which are incorporated herein by reference in their entireties.

BACKGROUND OF THE INVENTION

The present invention relates generally to the field of acoustic treatment and specifically to the field of acoustic panels. One market segment of the international music products industry is acoustic treatment—tuning the sonic characteristics of a room for a specific purpose and to achieve a desired balance between direct, reflected, diffused and absorbed sound. Within that segment are products designed for retail sale to the end users for use in commercial recording studios, home recording studios, rehearsal spaces and also in restaurants, night clubs, classrooms and other public spaces. Acoustic panels are one type of product used to tune a room's acoustic characteristics.

SUMMARY OF THE INVENTION

One embodiment of the invention relates to an acoustic panel with a mounting/hanging system, such as one or more grommets and/or D-rings, located along a rear surface of the panel within an outer perimeter defined by the acoustic panel. In one embodiment, the grommet does not extend through the acoustic panel substrate such that the grommet is not visible from the front of the panel. In one embodiment, the grommet is located outside of a rear surface of the acoustic panel substrate such that the grommet does not extend into the acoustic panel substrate. In one embodiment, the acoustic panel is formed from a fiberglass material having a density greater than 2 lbs. per cubic foot (pcf), specifically at least 3 lbs. pcf, more specifically of 3-4 lbs. pcf, and even more specifically of 3 lbs. pcf.

In one embodiment, the panel is rectangular and defines a first edge longer than a second edge positioned at a right angle relative to the first edge. The panel includes at least three grommets; a first grommet positioned at a corner between the first edge and the second edge, a second grommet positioned along the first edge spaced from the first grommet, and a third grommet positioned along the second edge spaced from the first grommet. The at least three grommets allow the acoustic panel to hang in either a vertical or horizontal position.

In one embodiment, the panel includes an outer cover surrounding the acoustic substrate. The outer cover includes a first section covering a front surface of the acoustic substrate and a second section covering the rear surface of the acoustic substrate. In one embodiment, the first section is formed from a first material, such as a first cloth material, having a first acoustic property, and the second section is formed from a second material, such as a second cloth material, having a second acoustic property different from the first acoustic property. In one embodiment, the material of the first section is stitched to the second material such that the stitch is positioned around a perimeter edge surface of the acoustic substrate.

In one embodiment an acoustic panel includes a sound absorbing substrate and a cover defining an interior cavity that is configured to surround an exterior of the substrate. The cover comprises a front panel having an outer surface, an inner surface, and an edge defining an outer periphery of the front panel. The front panel is formed of a first material. The cover also comprises a rear panel having an outer surface, an inner surface, and an edge defining an outer periphery of the rear panel. The rear panel is formed of a second material. At least a portion of the edge of the front panel being is attached to at least a portion of the edge of the rear panel to form the cover.

In one embodiment, an acoustic panel comprises at least one mounting structure. The at least one mounting structure comprises a first attachment portion and at least one mounting element. The mounting element extends outwards from the outer surface of the rear panel from a position on the rear panel located within an area defined by an outer perimeter of a rear surface of the substrate. The at least one mounting element does not have any direct contact with the substrate when the acoustic panel is assembled.

In one embodiment an acoustic panel comprises a sound absorbing substrate and a mounting structure configured for mounting the panel. A cover surrounds an exterior surface of the substrate. The cover comprises a front panel having an outer surface, an inner surface, and an edge defining an outer periphery of the front panel. The front panel is formed of a first material.

A rear panel has an outer surface, an inner surface, and an edge defining an outer periphery of the rear panel. The rear panel is formed of a second material that is different than the first material. The edge of the rear panel is folded, such that a portion of the inner surface of an outermost periphery of the rear panel is positioned opposite the inner surface of an inner portion of the rear panel to form a dual-layer strip portion.

The front panel is attached to the rear panel to form the cover. The front panel is attached to the rear panel along the dual-layer strip portion. The rear panel is arranged such that the dual-layer strip portion is positioned and extends outwardly from the outer surface of the front panel.

In one embodiment an acoustic panel comprises a sound absorbing substrate. The sound absorbing substrate has a density of greater than 2 pounds per cubic foot (pcf) and less than 6 pounds pcf.

A cover defines an interior cavity configured to cover an exterior of the substrate. The cover comprises a front panel having an outer surface and an inner surface. A rear panel has an outer surface and an inner surface.

At least one mounting structure is configured for mounting the acoustic panel. The at least one mounting structure comprises a first attachment portion. The first attachment portion is attached to the rear panel along the edge of the inner surface of the rear panel. The at least one mounting structure also comprises a second attachment portion.

In one embodiment, the at least one mounting structure also comprises at least one mounting element. The mounting element is attached to and extends outwards from an outer surface of the second attachment portion. The second attachment portion and attached mounting element are attached to the outer surface of the rear panel at a location that overlies the location at which the first attachment portion is attached to the rear panel.

At least one thread extends along at least a portion of an outer periphery of the first attachment portion. The thread passes through the first attachment portion, a portion of the rear panel extending between an outer surface of the first attachment portion and an inner surface of the second attachment portion, and through the second attachment portion.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

BRIEF DESCRIPTION OF THE DRAWINGS

The attached figures show various acoustic panel embodiments. In particular:

FIG. 3B illustrates a detailed, exploded, cross-sectional view of a layering arrangement between two materials forming a cover of an acoustic panel system according to one embodiment

FIG. 7A illustrates a detailed, exploded, cross-sectional view of a mounting structure according to one embodiment;

FIG. 7B illustrates a detailed, exploded, cross-sectional view of a mounting structure according to one embodiment;

DETAILED DESCRIPTION

In general, sound-absorbing acoustic panels, or baffles, are used to treat or tune a room's acoustic characteristics. Typically, such acoustic panels include an acoustic substrate surrounded by a cover. The substrate may be formed from a variety of materials, such as e.g. fiberglass, for sound absorption. The substrate may be available in various densities that have distinct acoustic properties (NRCs or Noise Reduction Coefficient values) and structural/cosmetic attributes. While a wide variety of densities are useful for acoustic panels, in various embodiments, the substrates have densities such as 0.75, 1.5, 1.65, 2, 3, 6-7, etc. pounds per cubic foot (pcf).

Acoustic panels may be wall-mounted, ceiling-mounted or hanging in free space. Accordingly, acoustic panels may be formed with a mounting arrangement configured to allow a user to attach the acoustic panel to a wall, ceiling, or other structure as needed.

Figure 1A:
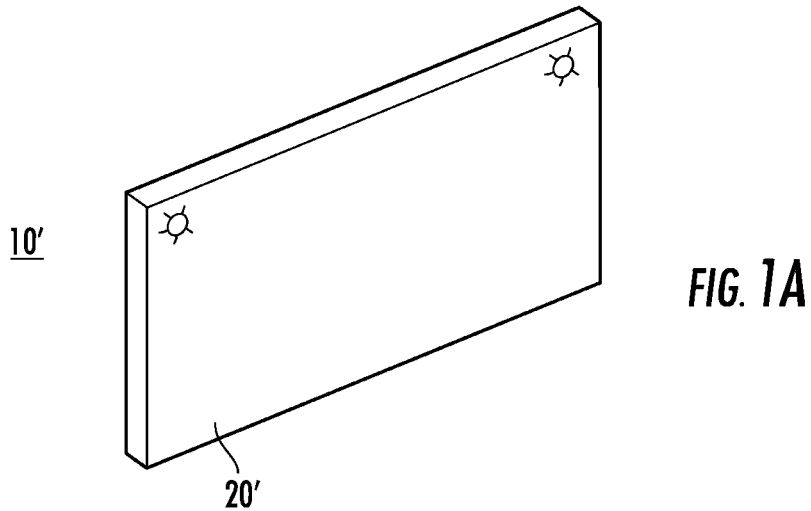
FIGS. 1A-1C illustrate various examples of prior designs of acoustic panels.
Figure 1B:
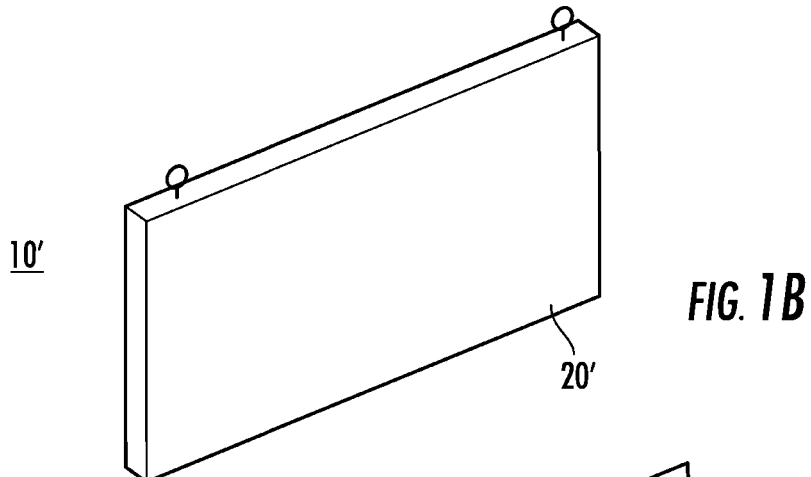
Figure 1C:
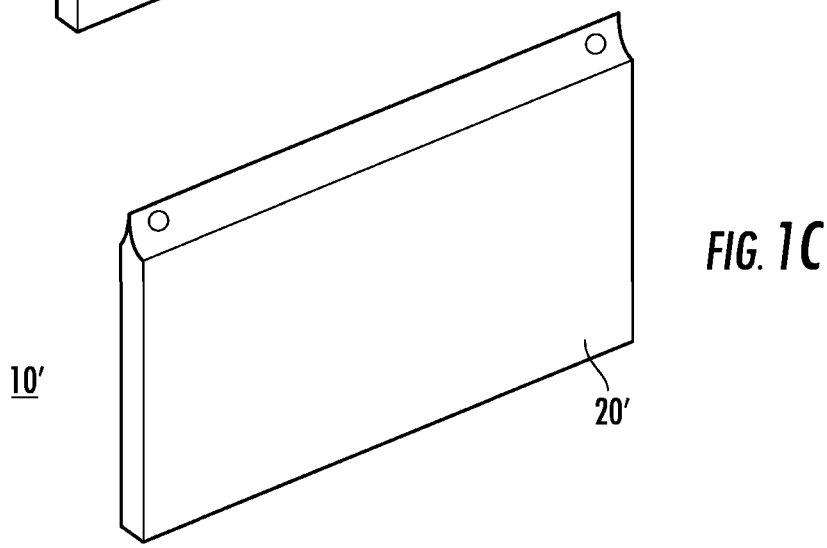

Illustrated in FIGS. 1A-1C are various acoustic panel designs 10' according to prior designs. As shown in FIGS. 1A-1C, such prior panel designs 10' include a substrate surrounded by a cover 20' made from a single material.

The type of mounting arrangement usable with prior panel designs 10' may be limited by the density of the substrate used for the panel design 10'. In some prior panel designs 10', a through-grommet arrangement, such as shown in FIG. 1A is utilized, in which a grommet extends entirely through the front and rear surfaces of the cover 20' and through the substrate. In such designs, the grommet and grommet opening is located along and visible on both the front-most and rear-most external surfaces of the panel.

However, Applicant understands that such a through-grommet arrangement is limited to panel designs 10' incorporating a substrate having a low density (i.e., less than 2 lbs. pcf). For panel designs 10' formed of a substrate having a higher density (i.e., more than 2 lbs. pcf), the density of the substrate reduces/eliminates the ability to place a grommet through the substrate, as the low density of the substrate will not provide sufficient structure to which the grommet may be mounted and fixedly supported. Furthermore, the piercing/penetration of the substrate required to attach the grommet results in damage to the low density substrate.

Referring to FIG. 1B, in some prior panel designs 10' formed of a high density substrate (i.e. having a density of more than approximately 6 lbs. pcf), the higher density and rigidity of the substrate may allow for the edges of the substrate to be chemically hardened. Once hardened, a mounting element, such as e.g. an eyelet screw shown in the panel design 10' of FIG. 1B, may be attached to the prior panel design 10' by inserting the mounting element through the cover 20' and into the hardened edge of the substrate. As illustrated in FIG. 1B, in such a panel design 10', the eyelet screw extends outwards from and above the panel to which it is attached.

However, for prior panel designs 10' incorporating a medium density substrate (i.e. having a density greater than 2 lbs. pcf and less than 6 lbs. pcf., e.g. a substrate having a density of approximately 3 lbs. pcf), the prior through-grommet design, as illustrated e.g. in FIG. 1A, cannot be used to mount the panel design 10', as the density of the substrate is too high to punch the grommets through the substrate without damaging the substrate.

Furthermore, although it may be possible to chemically harden the edges of a medium density substrate, the treated edges of such medium density substrates will tend to chip and deteriorate in a short time, resulting in the attachment of any inserted mounting element (e.g. eyelet screw) to the substrate being compromised and possibly even becoming entirely detached from the substrate. Accordingly, the use of a mounting element attached directly to a chemically hardened edge of the substrate, such as e.g. illustrated in the high density substrate prior panel design 10' embodiment shown in FIG. 1B, is also not a suitable option for a panel design 10' formed of a medium density substrate.

In light of the limitations of prior mounting arrangements for panel designs 10' formed of medium density substrates (e.g. having a density of approximately 3 lbs. pcf), prior mounting arrangements for such panel designs 10' tend to rely on mounting the panel design 10' to a frame or on the incorporation of a mounting flap, such as shown e.g. in FIG. 1C, extending outwards from the cover 20'.

However, Applicant has found that such prior mounting arrangement options for panel designs 10' formed of a medium density substrate provide unsatisfactory mounting solutions. Specifically, the added material needed to form a mounting frame adds to the cost of the panel design 10', and also adds to the weight of the panel design 10', making installation of the panel design 10' more difficult. On the other hand, the mounting flap option, such as shown e.g. in FIG. 1C, requires an externally visible mounting portion, which may detract from the overall cosmetic/aesthetic appeal of the panel design 10'.

Accordingly, prior to Applicant's acoustic panel system 100 as discussed herein, it is Applicant's understanding that the industry has never found a satisfactory mounting system to utilize medium density substrate material (e.g. 3 lbs. pcf material) due the inability to use through-grommets, the inability to use chemical edge strengthening techniques on this density substrate, and the visual detraction of an externally visible mounting flap.

Figure 2:
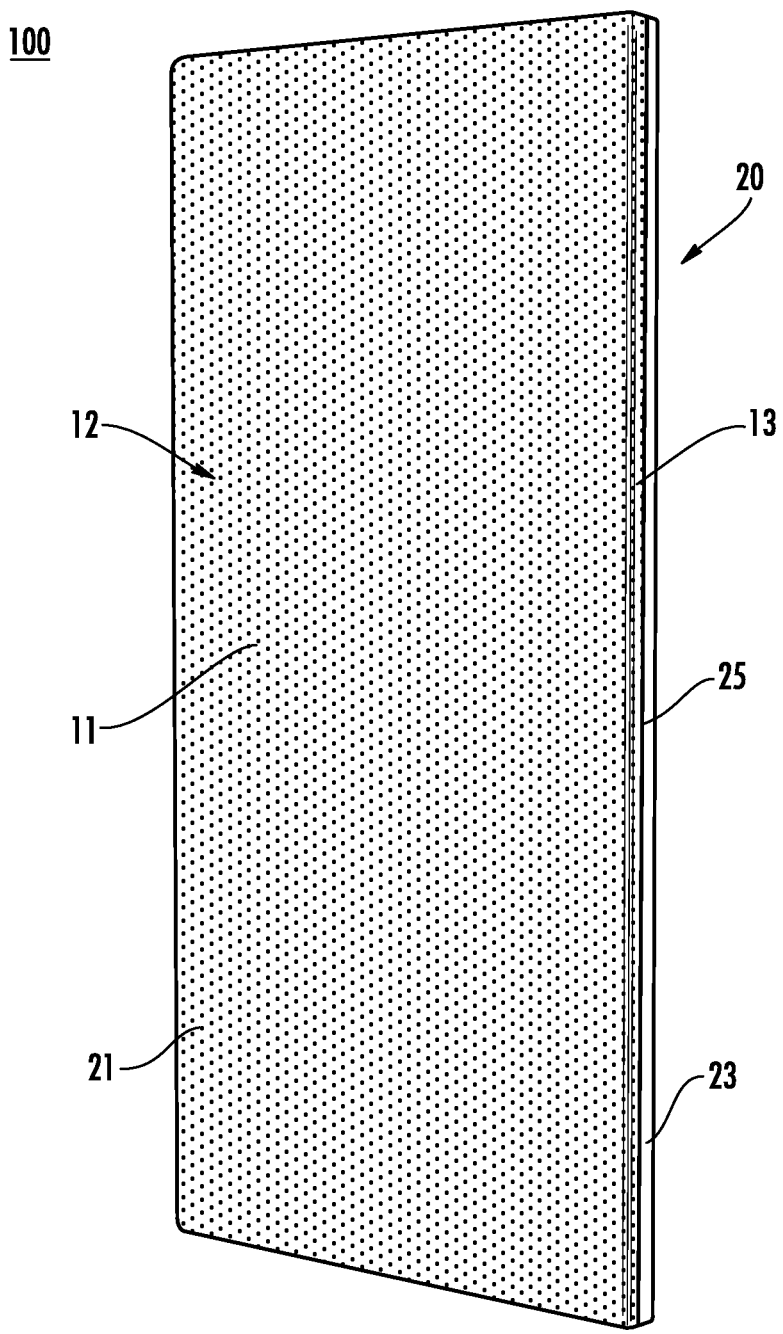
FIG. 2 illustrates a top perspective view of a front surface of an acoustic panel system according to one embodiment.

Referring to FIG. 2, an acoustic panel system 100 according to one embodiment is illustrated. The acoustic panel system 100 as described herein may be used with a substrate having any desired density, including low density (2 lbs. pcf or less, e.g. 0.75, 1.5, 1.65, 2), medium density (greater than 2 lbs. pcf and less than 6 lbs. pcf, such as, e.g. 3 lbs. pcf) and high density (6 lbs. pcf or greater). In various embodiments, the substrate may have a density of 3-4 lbs. pcf, 3-3.5 lbs. pcf, and more specifically 3 lbs. pcf, as such substrate densities provides very high level absorption specifications (NRC). In one embodiment, the substrate may be formed from Owens Corning 703 3-lbs. pcf material.

In general, the dimensions of the acoustic panel system 100 will correspond to the dimensions of the substrate. Accordingly, an acoustic panel system 100 as illustrated in FIG. 2 may be used interchangeably with any similarly-dimensioned substrates, regardless of the density of the substrate.

In some embodiments, the substrate may comprise one or more substrate materials having the same or different densities. In such embodiments, the one or more substrate materials may be formed as discrete units that are assembled together to form the substrate, or may be formed as a single, integral, multi-layer substrate As shown in FIG. 2, in one embodiment the acoustic panel system 100 comprises a cover 20 surrounding the acoustic substrate. The cover 20 may include one or more of a variety of suitable materials including fabric, PVC, sailcloth or fiberglass scrim that encapsulate the acoustic substrate. The cover 20 may be formed of a material configured to allow sound to pass through and be absorbed by the substrate. The cover 20 may also serve a protective and/or decorative function. For example, the choice of the material for the cover 20 may in part be based on the ability of the material to protect the substrate from damage (e.g. wear and tear resulting from exposure to the ambient environment/conditions, contact, etc.). In some embodiments, the material forming the cover 20 may alternatively or additionally be selected in part based on the aesthetic design of the material (e.g. pattern, color, texture) and/or a desired visual affect to be provided by the acoustic panel system 100.

Referring to FIG. 2, in one embodiment, the cover 20 may be formed from a front panel 21 and a rear panel 23. The front panel 21 and rear panel 23 may be formed of the same or different materials. In some embodiments, the front panel 21 and the rear panel 23 may be formed of materials having different acoustic properties from each other, so as to improve the overall function of the acoustic panel system 100. For example, the front panel 21 may be formed of a material that is substantially acoustically transparent, and which is configured to allow sound to be absorbed by the substrate with no, or minimal, reflection. In one embodiment, the front panel 21 may be formed of a Guilford of Maine acoustic fabric, such as 2100 FR701, which allows sound to be absorbed by the substrate with no or minimal reflection.

In one embodiment, the rear panel 23 may be formed of a material that is less acoustically transparent than the front panel 21, but which is better at absorbing low frequencies. Additionally, the rear panel 23 may be formed of a smoother or slicker material so as to minimize the Velcro-like friction effect that may result when all-fabric acoustic panels are stacked one on top of another. In one embodiment, the rear panel 23 may be formed from a nylon ripstop sailcloth material. For example, the rear panel 23 may be formed from 70D Urethane Ctd *FR* Nylon Ripstop, Flame Retardant, ¾ oz. UV Urethane Ctd-59/60.

Figure 3A:
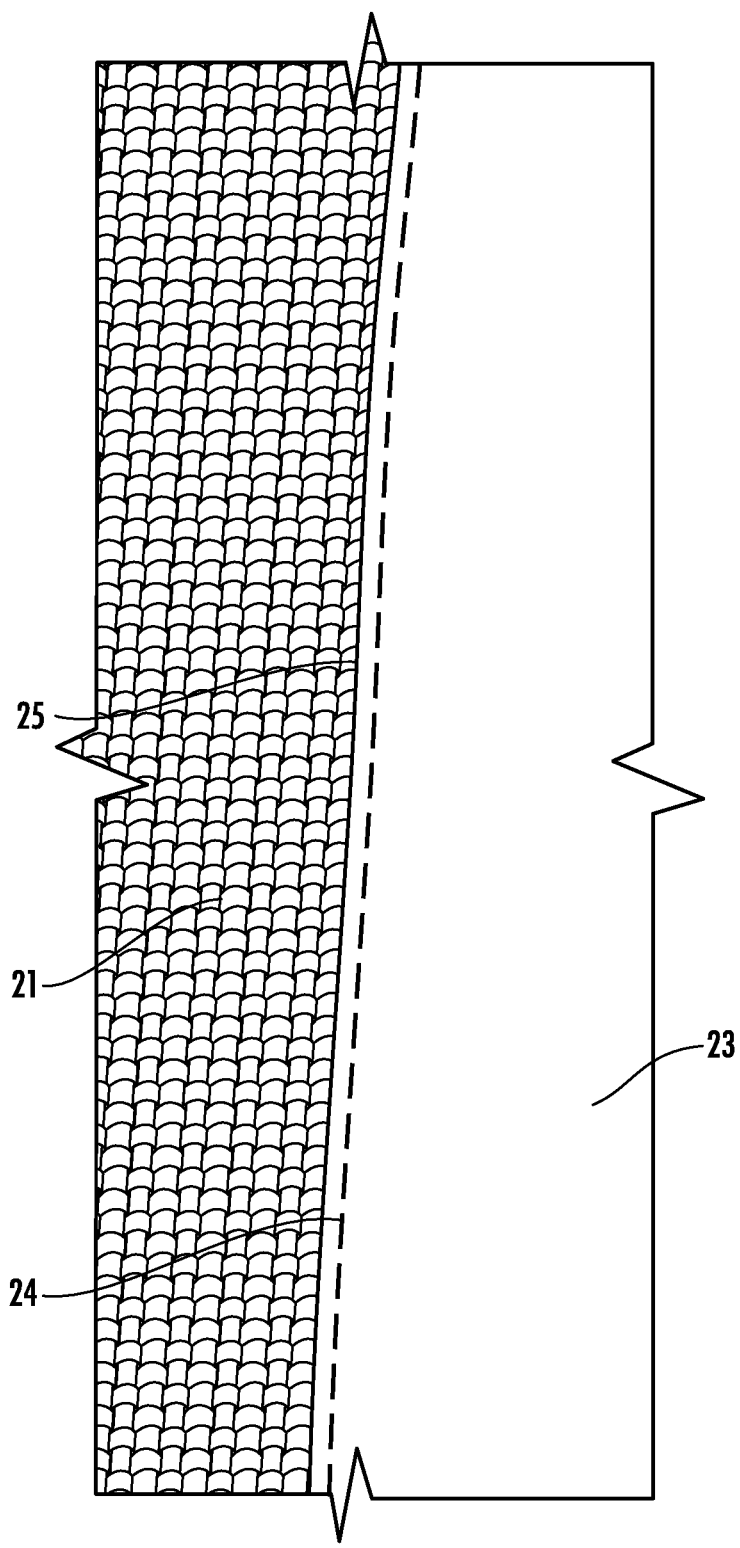
FIG. 3A illustrates a detailed view of an interface between two materials forming a cover of an acoustic panel system according to one embodiment.

The front panel 21 and rear panel 23 may be attached together along an interface 25 in a manner that provides a tight fit and proper positioning of the cover 20 relative to the substrate. Referring to FIG. 3A, a detailed view of the interface 25 between the front panel 21 and rear panel 23 according to one embodiment is illustrated. As shown in FIG. 3A, in one embodiment, the outer edge of the rear panel 23 is attached along the edge of the outer surface of the front panel 21 by a sewn or stitched attachment 24.

Illustrated in FIG. 3B is an exploded cross-sectional view of the embodiment of the layered attachment arrangement between the front panel 21 and rear panel 23 of FIG. 3A. As shown in FIGS. 3A and 3B, the attachment arrangement of the front and rear panels 21, 23 is configured to provide an interface 25 having clean edges and to provide a flat and sleek connection between the front and rear panels 21, 23 that is configured to avoid creating any bulges or wrinkles when the covered 20 is applied over the substrate.

As shown in FIG. 3B, in one embodiment, a portion of the edge of the rear panel 23 may be folded back in on itself to create a thin dual-layered strip 22 that forms a border-like edge around the rear panel 23. The front panel 21 and rear panel 23 are subsequently attached along the dual-layered strip 22 to form cover 20. As illustrated in FIG. 3A, this attachment of the front and rear panels 21, 23 along the dual-layered strip 22 may comprise a sewn or stitched attachment 24.

In some embodiments, the interface 25 between the rear panel 23 and the front panel 21 is positioned along the edge surfaces 13 of the acoustic panel system 100. As illustrated in FIG. 2, in one embodiment, the interface 25 may extend along a middle portion of the edge surface 13 of the acoustic panel system 100. In other embodiments, the interface 25 between the rear panel 23 and the front panel 21 may be positioned about other parts of the acoustic panel system 100, such as, e.g. the rear surface 12 of the acoustic panel system 100.

The dimensions of the cover 20 are selected relative to the size of the substrate, with the dimensions of the cover 20 being substantially similar to those of the substrate to provide a cover 20 having a tight tolerance in relation to the substrate. In some embodiments, the dimensions of the cover 20 may be slightly smaller than the dimensions of the substrate, such that the cover 20 is slightly stretched across the substrate after the cover 20 is applied to the substrate to provide a visually appealing, tight fit with minimal wrinkling or sagging of the cover 20.

In some embodiments, the cover 20 may be applied to the substrate via an adhesive or glued connection. In other embodiments, the cover 20 may be formed as a bag-like structure having an opening through which the substrate is inserted. Once the substrate has been inserted into the bag-like structure, the opening may be closed, e.g. by sewing, via a zipper sewn into the cover 20, etc. after the substrate has been inserted into the bag-like structure.

In embodiments in which the cover 20 is provided as a bag-like structure, and particularly where the cover 20 is dimensioned to provide a tight fit about the substrate, the insertion of the substrate into the cover 20 may be facilitated by initially wrapping the substrate in a plastic sheet or other low-friction material. Once the plastic sheet-covered substrate has been inserted, the plastic sheet is removed, and the open edge of the cover 20 is shut as described above.

Figure 4A:
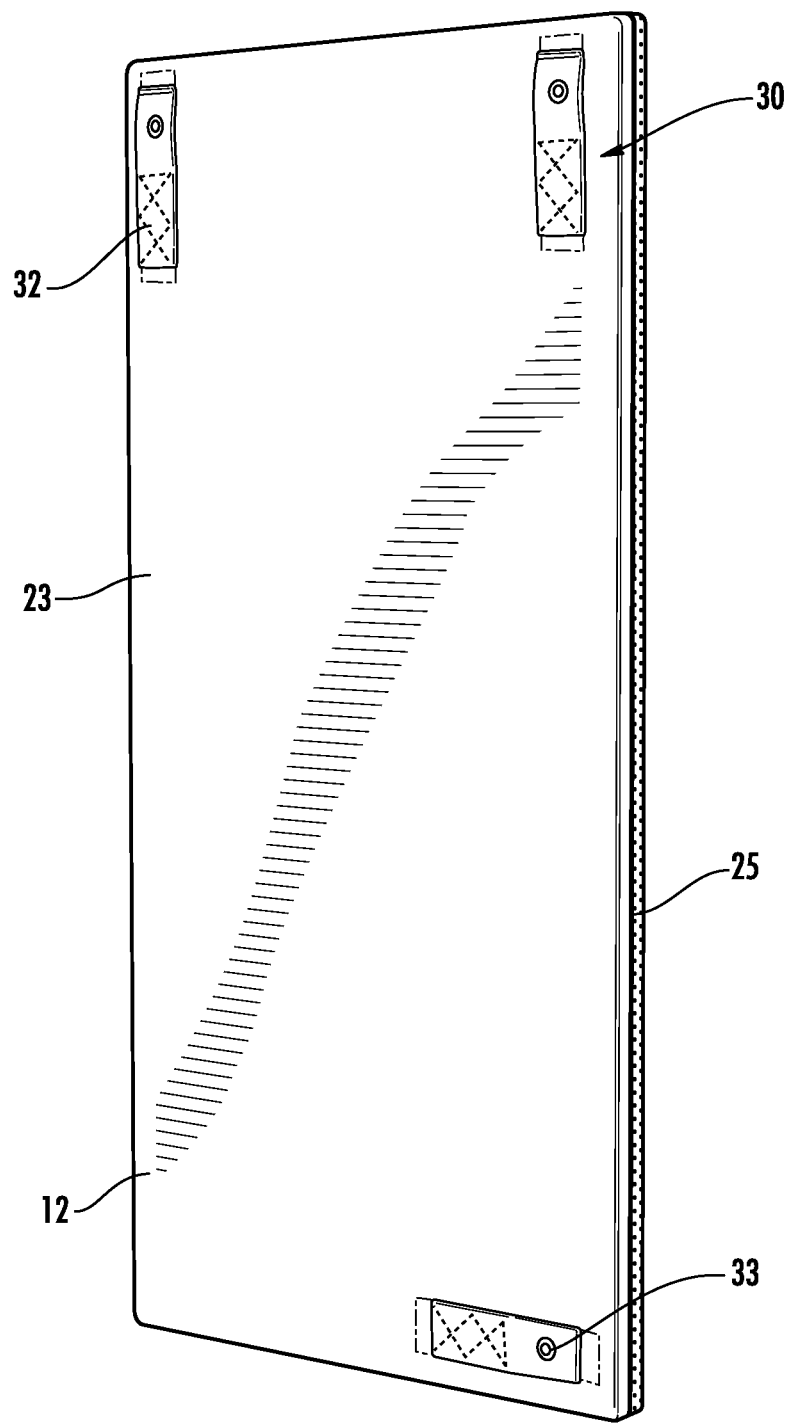
FIGS. 4A and 4B illustrate top perspective views of rear surfaces of acoustic panel systems according to different embodiments.
Figure 4B:
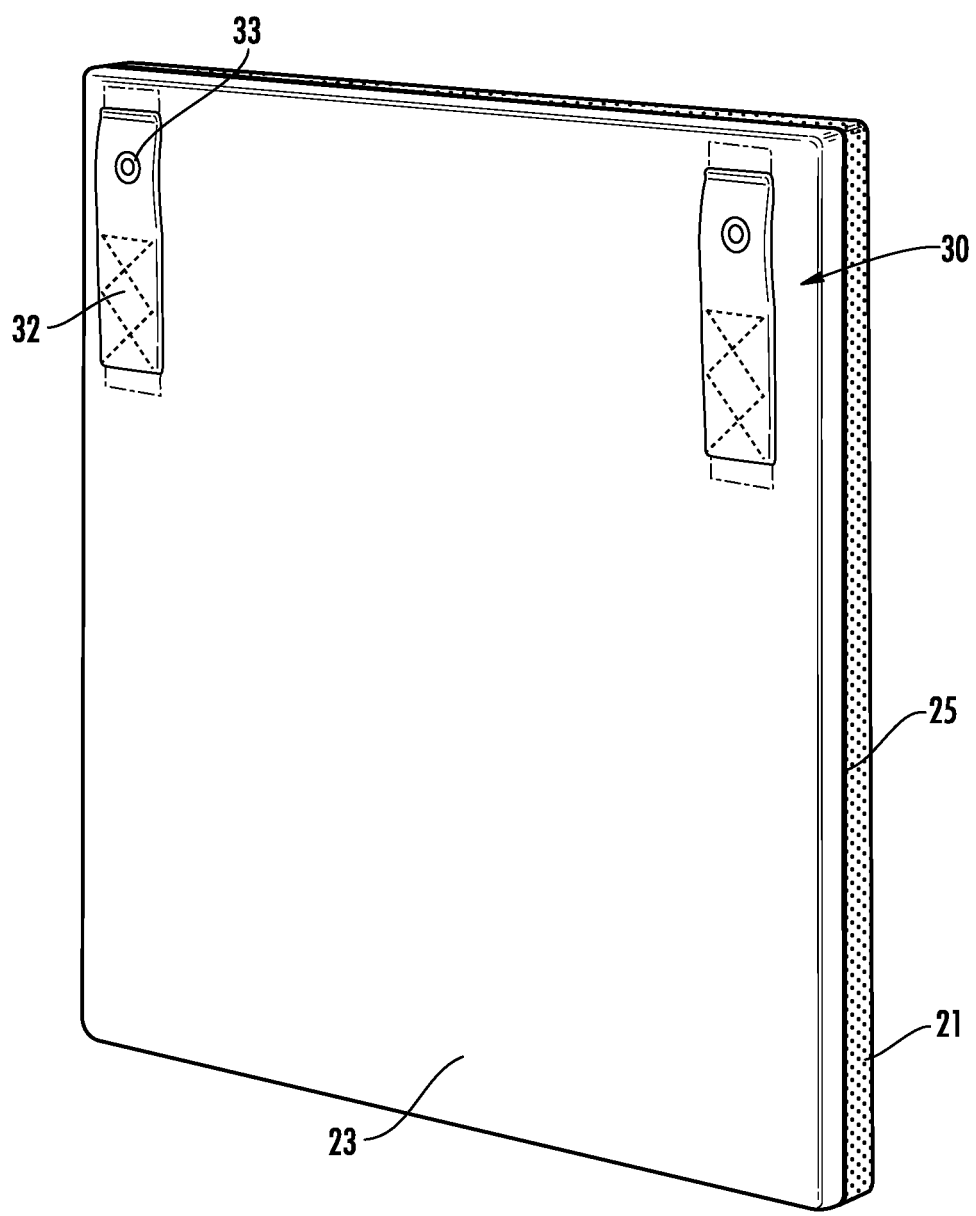

As illustrated in FIGS. 4A and 4B, in some embodiments the rear surface 12 of the acoustic panel system 100 may be formed with one or more hidden mounting structures 30 that do not extend along either the front surface 11 or edge surface 13 of the acoustic panel system 100, such that the mounting structure(s) 30 is not visible once the acoustic panel system 100 has been mounted to a structure. Such a hidden mounting structure 30 arrangement allows the acoustic panel system 100 to be mounted without detracting from or disrupting the visual aesthetic of the acoustic panel system 100 design.

The mounting structure 30 allows for the acoustic panel system 100 to be mounted flush to a wall with simple nails or screws, and without any special equipment. Accordingly, the mounting structure 30 provides a low-weight, easy to position arrangement for mounting the acoustic panel system 100 as needed within a room, regardless of the density of the substrate used in the acoustic panel system 100, and without detracting from the overall appearance of the acoustic panel system 100.

As shown in FIGS. 4A and 4B, in some embodiments, the one or more mounting structures 30 may be arranged along the outer perimeter of the rear surface 12 of the acoustic panel system 100. The arrangement of the mounting structure(s) 30 along the rear surface 12 may take any number of forms. As illustrated in FIG. 4A, in some embodiments, the arrangement of mounting structures 30 may allow for both horizontal and vertical mounting of the acoustic panel system 100. As illustrated in FIG. 4B, in other embodiments, the arrangement of mounting structures 30 provide for only uni-directional mounting. In some embodiments, the arrangement of mounting structures 30 may be configured to allow for angled mounting.

Figure 5A:
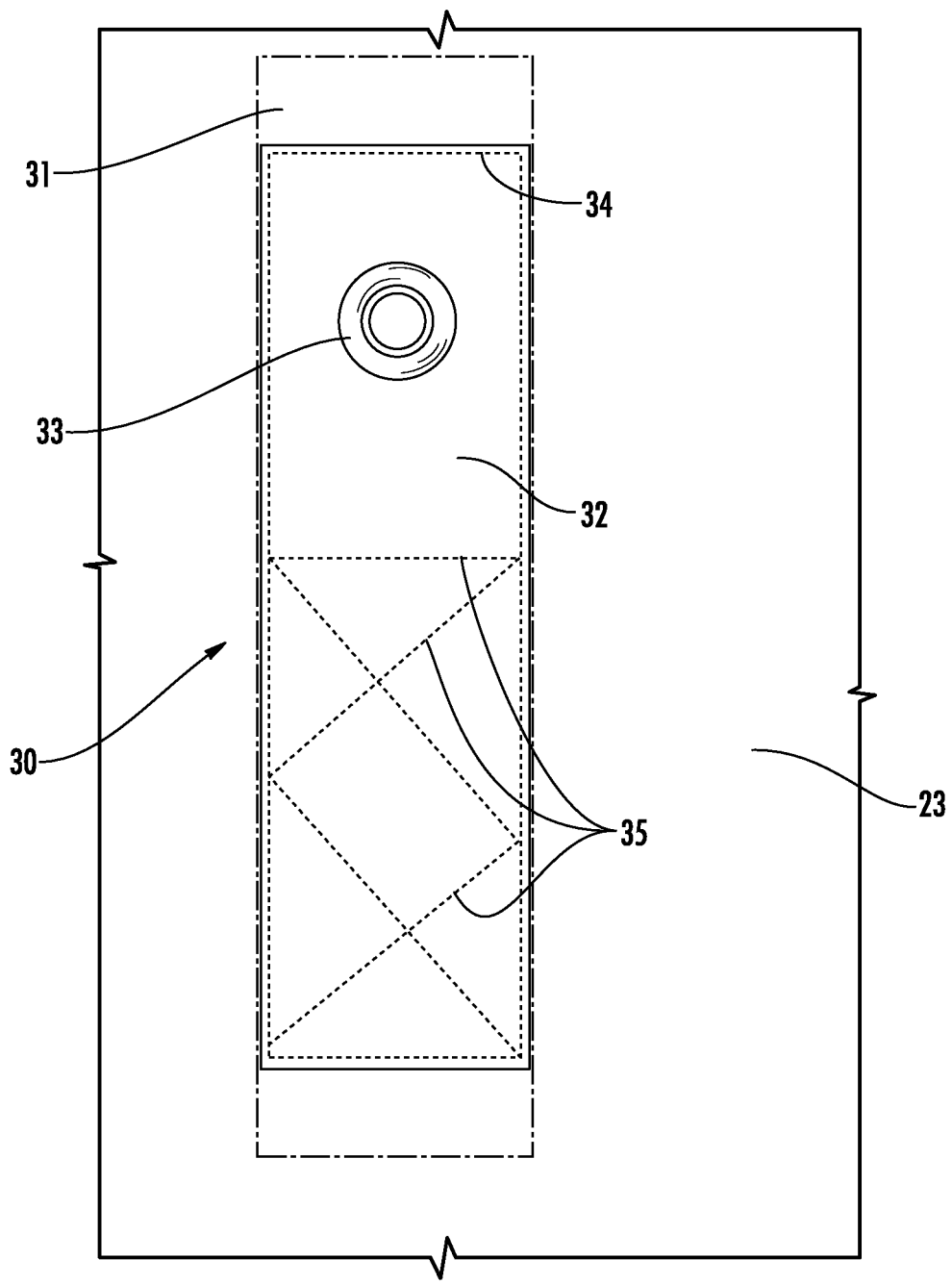
FIG. 5A illustrates a detailed view of a mounting structure according to one embodiment.
Figure 5B:
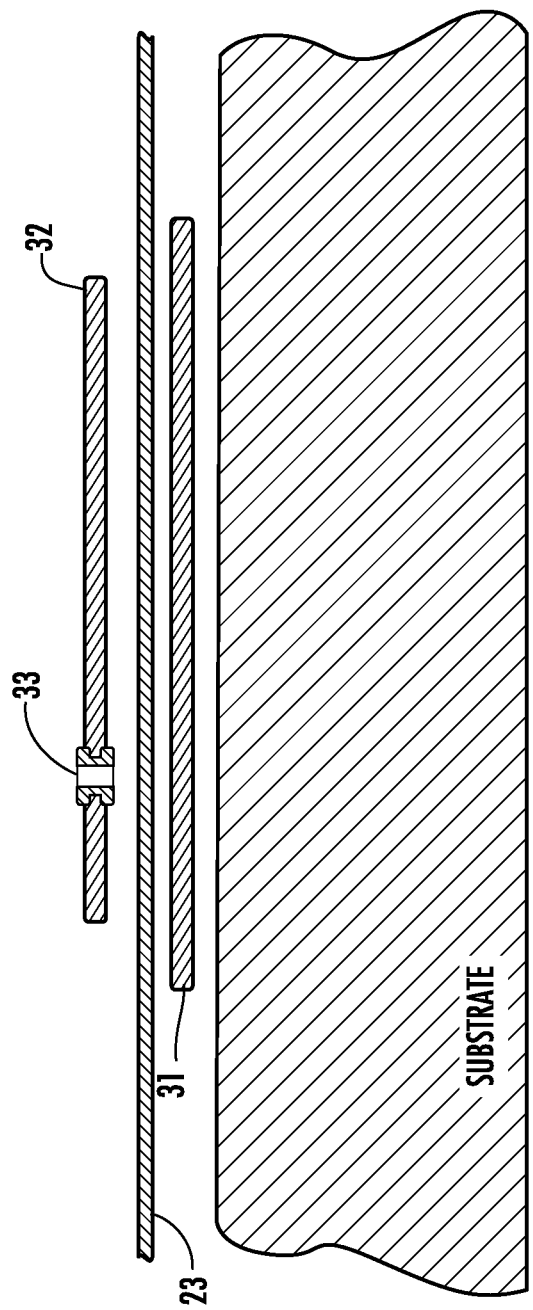
FIG. 5B illustrates a detailed, exploded, cross-sectional view of a mounting structure according to one embodiment.

As illustrated in the detailed view of the embodiment of a mounting structure 30 of FIG. 5A, and in the exploded view of the mounting structure 30 of FIG. 5B, in one embodiment mounting structure 30 generally comprises a first base 31 (shown in outline in FIG. 5A), a second base 32, and one or more mounting elements 33 (e.g. a grommet, D-ring, O-ring, hook, etc.). In some embodiments, the mounting elements 33 of each of the mounting structures 30 can all be the same. In some embodiments, the mounting elements 33 of the mounting structures 30 used on the acoustic panel system 100 may comprise a combination or two or more types of mounting elements 33, and/or can differ from the mounting elements 33 used with other mounting structures 30 used on the acoustic panel system 100.

In one embodiment, the first base 31 and second base 32 are made of strips of a durable, wear and tear resistant material. For example, the first base 31 and second base 32 may be made from a heavy-weight nylon webbing strap. In one embodiment, the first base 31 may comprise a 2 inch by 8 inch strip of a heavy-weight nylon webbing strap and the second base 32 may comprise a 2 inch by 7 inch strip of a heavy-weight nylon webbing strap.

In some embodiments, an upper surface of the first base 31 is attached to an inner surface the rear panel 23. A mounting element 33 is attached to the second base 32. In some embodiments, the mounting element 33 may extend from only an outer surface of the second base 32. In other embodiments, e.g. such as illustrated by the mounting element 33 of FIG. 5B, the mounting element 33 may comprise an element that extends entirely through the second base 32.

For example, referring to FIGS. 5A and 5B, in one embodiment the mounting element 33 may comprise a metal or plastic ring-like structure that extends entirely through the second base 32. To attach the ring-like mounting element 33 to the second base 32, a hole or opening is created in the second base 32 which generally corresponds to a diameter of the ring-like mounting element 33. The ring-like mounting element 33 is inserted into the opening in the second base 32 such that the hollow opening of the ring-like structure extends from a top surface of the second base 32 to the bottom surface of the second base 32.

The upper and lower edges of the ring-like mounting element 33 may include outwardly projecting flanges configured to engage the upper and lower surfaces of the second base 32 so as to more securely attach the ring-like mounting element 33 to the second base 32. Once the ring-like mounting element 33 has been attached to the second base 32, the rigid inner surface of the ring-like mounting element 33 provides a reinforced opening into which a screw, nail, or other mounting attachment can be inserted to mount the acoustic panel system 100.

Once the mounting element 33 has been attached to the second base 32, the second base 32/mounting element 33 is attached to the outer surface of the rear panel 23. As illustrated in FIG. 5A, the combined second base 32/mounting element 33 is attached to the rear panel 23 at a location corresponding to the location of the attachment of the first base 31 to the rear panel 23.

A illustrated in FIG. 5A, in one embodiment the first and second bases 31, 32 may be attached to one another via an attachment, such as e.g. a sewn or stitched attachment 34 extending about an outer periphery of the second base 32. Alternatively, or additionally, in some embodiments the first and second bases 31, 32 may be attached to one another via an attachment, such as e.g. a sewn or stitched attachment 35 located and extending through the interior of the second base in any number of patterns, such as, e.g. illustrated in FIG. 5A.

Referring to FIG. 5B, in some embodiments of the mounting structure 30, the mounting structure 30 is configured such that no attachment to, insertion into, piercing, or penetration of the substrate is required to attach a mounting element 33 to the acoustic panel. Instead, as shown in FIG. 5B, the mounting element 33 is attached to the cover 20 via the mounting structure 30.

Additionally, the embodiment of the mounting structure 30 comprising heavy duty first and second bases 31, 32 is configured to allow a mounting element 33 to be attached to the cover 20 without compromising the cover 20 and/or without risking tearing or other damage to the cover 20.

Specifically, as illustrated in FIGS. 5A and 5B, in certain embodiments, such as e.g. where the mounting element 33 comprises a grommet, attachment of the mounting element requires penetration of the surface to which the mounting element is to be attached. For thinner, less durable materials e.g. such as those that may be used to make a cover, such penetration may result in tearing or weakening of the cover. Additionally, once mounted, the force imparted onto the cover material by the mounting element as a result of the weight of the panel may lead to additional tearing of the cover material. Accordingly, attaching a mounting element directly to such a thinner, less durable cover material may compromise both the cover and the ability to successfully and securely mount the acoustic panel.

Accordingly, attaching the mounting element 33 to a heavy duty second base 32 which is configured to be stitched or sewn onto the cover 20 obviates the need to create a large hole through the cover 20 for attaching the mounting element, and also allows the weight of the mounted acoustic panel system 100 to be distributed over a larger surface area of the cover 20, thereby lowering the risk of tearing and/or other damage to the cover 20. Furthermore, the incorporation of a first base 31 provides a more stable attachment to which the second base 32/mounting element 33 combination may be attached, which further serves to protect and minimize damage to the cover 20 and/or to the attachment of mounting element 33 to the acoustic panel system 100.

However, it is to be understood that in embodiments in which the material forming the rear panel 23 is sufficiently durable to withstand attachment of a mounting element 33 directly thereto, and/or in embodiments where the weight of the acoustic panel system 100 is sufficiently low that the force exerted on the material of the rear panel 23 by the mounting element 33 when the acoustic panel system 100 is mounted will not damage the cover 20, the mounting structure 30 may be formed with only a single base (i.e. only the first base 31 and/or only the second base 32) or with no base 31, 32 (i.e. such that the mounting element 33 is attached directly to the rear panel 23).

Figure 6A:
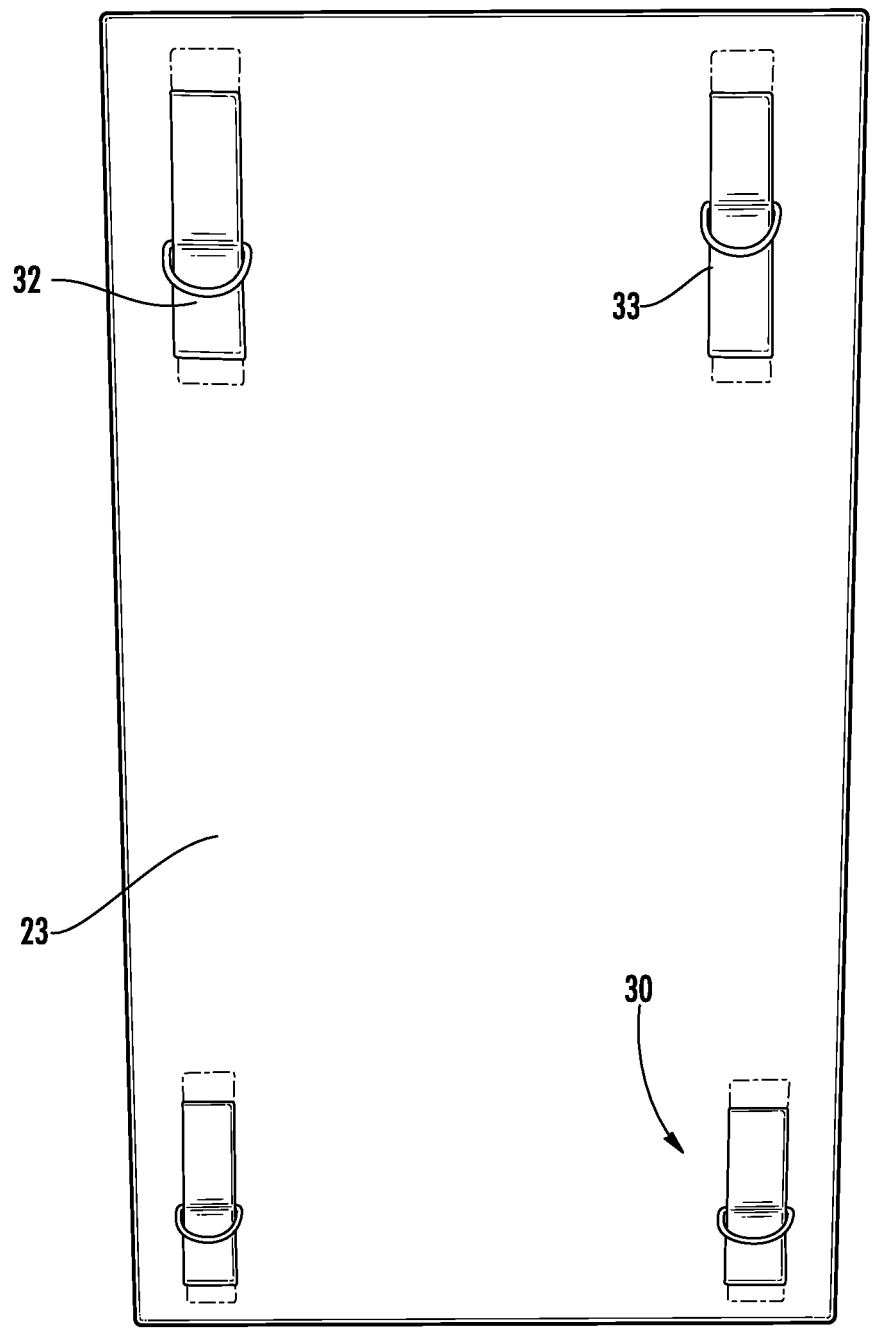
FIGS. 6A and 6B illustrate top perspective views of rear surfaces of acoustic panel systems according to different embodiments.
Figure 6B:
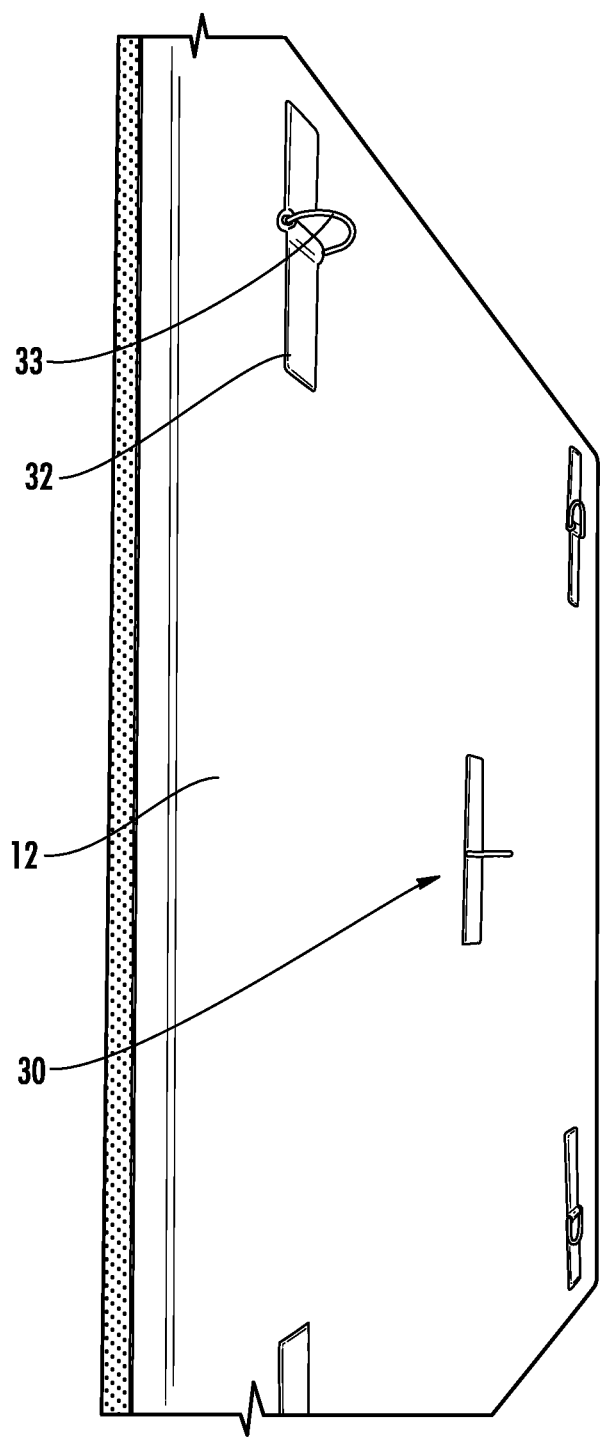

Referring to FIGS. 6A and 6B, in some embodiments the mounting element 33 of the mounting structure 30 may comprise a ring-like structure, such as, e.g. a D-ring as shown in FIGS. 6A and 6B. The D-ring mounting element 33 may be attached with a tight/close fit to the rear surface 12/second base 32, such that the D-ring is capable of being positioned at a generally 90 degree angle relative to the rear surface 12, such as illustrated in FIG. 6B, so as to allow for easier mounting of the acoustic panel system 100.

The size of the D-ring mounting element 33 may be any dimension as desired for a particular acoustic panel design/arrangement. In one embodiment, the D-ring may be 2 inches by 1.25 inches, and have a thickness of between 3/16" and 3/32".

As illustrated in FIG. 7A, in one embodiment of a mounting structure 30 in which the mounting element 33 comprises a D-ring, mounting structure 30 may be arranged such that the D-ring 33 is attached to and held in place directly in-between the rear panel 23 and the second base 32. Because in the embodiment of FIG. 7A the D-ring is positioned in-between the second base 32 and the rear panel 23, the second base 32 and rear panel 23 do not extend along a continuous, uninterrupted contact surface.

In other embodiments, such as e.g. illustrated in FIG. 7B, the second base 32 may comprise a dual layer structure 32a/32b, with the D-ring attached to and held in place between the layers 32a/32b of the second base 32. In contrast to the embodiment of 7A, in the embodiment of FIG. 7B, the D-ring mounting element 33 does not have any direct attachment to the rear panel 23. Accordingly, the second base 32 and rear panel 23 may extend along and form a continuous, uninterrupted contact surface.

Additionally, because in the embodiment of FIG. 7B the D-ring is pre-attached between the layers 32a/32b of the second base 32, attachment of the second base 32/D-ring mounting element 33 arrangement to the first base 31 to form the mounting structure 30 may be done in a single step. In contrast, in the embodiment of FIG. 7A, attachment of the second base 32/D-ring mounting element 33 arrangement to the first base 31 to form the mounting structure 30 first requires positioning the D-ring mounting element 33 in the desired location along the rear panel 23, and subsequently positioning the second base 32 over the positioned D-ring mounting element 33 and attaching the second base 32 to the rear panel 23/first base 31 in order to secure the D-ring mounting element 33 to form the mounting structure 30.

The arrangement and structure of the mounting structure 30, including mounting element 33, is configured to provide for easy installation of the acoustic panel system to a variety of structures. In some embodiments, e.g. in embodiments in which the mounting element 33 comprises a D-ring, such as illustrated by the embodiments of FIGS. 6A and 6B, the mounting structures 30 are configured to allow the acoustic panel system 100 to be mounted in any number of ways: e.g. flush mounted against a wall; hung as a cloud from a ceiling; extending over/covering a corner as a bass trap (e.g. using optional hardware allowing for easy corner installation), etc. In particular, the mounting structure 30 is configured to allow the acoustic panel system 100 to be mounted to any such surface without requiring any modification/addition to the mounting structure 30, regardless of the type of mounting configuration in which the acoustic panel system 100 was previously utilized.

The acoustic panel system 100 can be formed in any number of dimensions. In various embodiments, the acoustic panel system 100 can measure 24 inches by 24 inches by 2 inches; 24 inches by 48 inches by 2 inches; 48 inches by 48 inches by 2 inches; 48 inches by 96 inches by 2 inches, etc.

In various embodiments, the mounting structures 30 are spaced along the peripheral edge of the rear surface 12 of the acoustic panel system 100 such that the mounting elements 33 of the mounting structures 30 are spaced between 0 and 12 inches from the peripheral edge or the rear surface 12, including between 1 and 8 inches from the peripheral edge, between 2 and 6 inches from the peripheral edge, including 2 inches from the peripheral edge, 4 inches from the peripheral edge, and 6 inches from the peripheral edge of the rear surface 12.

Referring, for example, to FIG. 4A, in some embodiments, mounting structures 30 that are mounted at a corner of the rear surface 12 may be spaced along the rear surface 12 such that the mounting element 33 of the mounting structure 30 is located at the same distance from a first peripheral edge of the rear surface 12 as it is to a second peripheral edge of the rear surface 12. For example, in one embodiment, the mounting element 33 is spaced 2 inches from both a first peripheral edge of the rear surface 12 and 2 inches from a second peripheral edge of the rear surface 12.

In some embodiments, e.g. such as shown in FIG. 6A mounting structures 30 that are mounted at a corner of the rear surface 12 may be spaced along the rear surface 12 such that the mounting element 33 of the mounting structure 30 is further from a first peripheral edge of the rear surface 12 than from a second peripheral edge of the rear surface 12.

For example, in one embodiment, the mounting element 33 is spaced 6 inches from a first peripheral edge of the rear surface 12 and is spaced 4 inches from a second peripheral edge of the rear surface 12.

In addition to, or as an alternative to, arranging the mounting structures 30 along the outer periphery of the rear surface 12, one or more mounting structures 30 may be arranged along an inward portion of the rear surface 12. In one embodiment, e.g. such as illustrated in FIG. 6B, a mounting structure 30 may extend from a centermost portion of the acoustic panel system 100.

Figure 8:
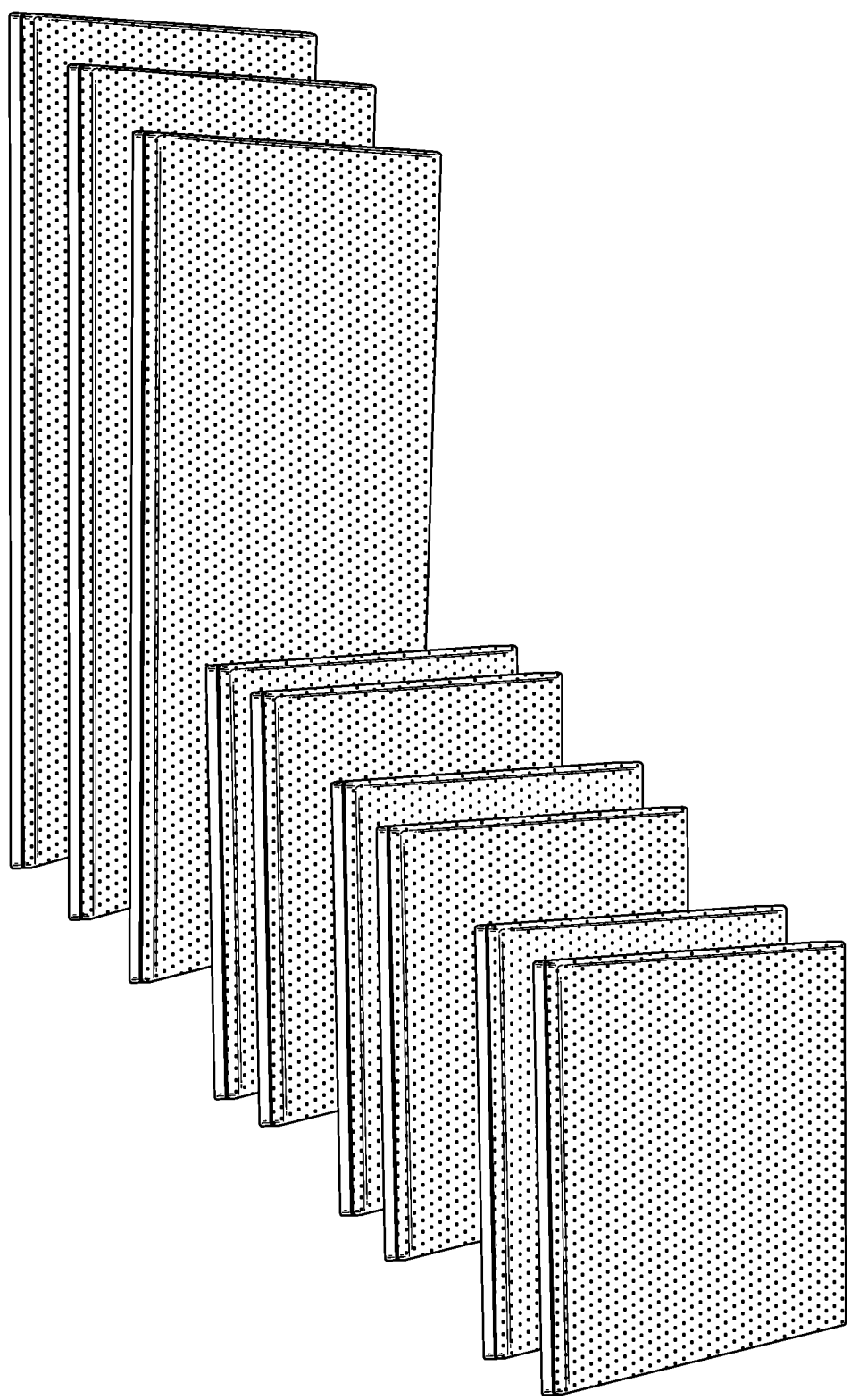
FIG. 8 illustrates various embodiments of acoustic panel systems.

As noted previously, an acoustic panel system 100 formed with a hidden mounting structure 30 as described herein may be used with substrates of any density level (i.e. low density, medium density, and high density.). Referring to FIG. 8, it is also to be understood that the acoustic panel system 100 may be formed and used with substrates having any number of sizes and dimensions.

Figure 9:
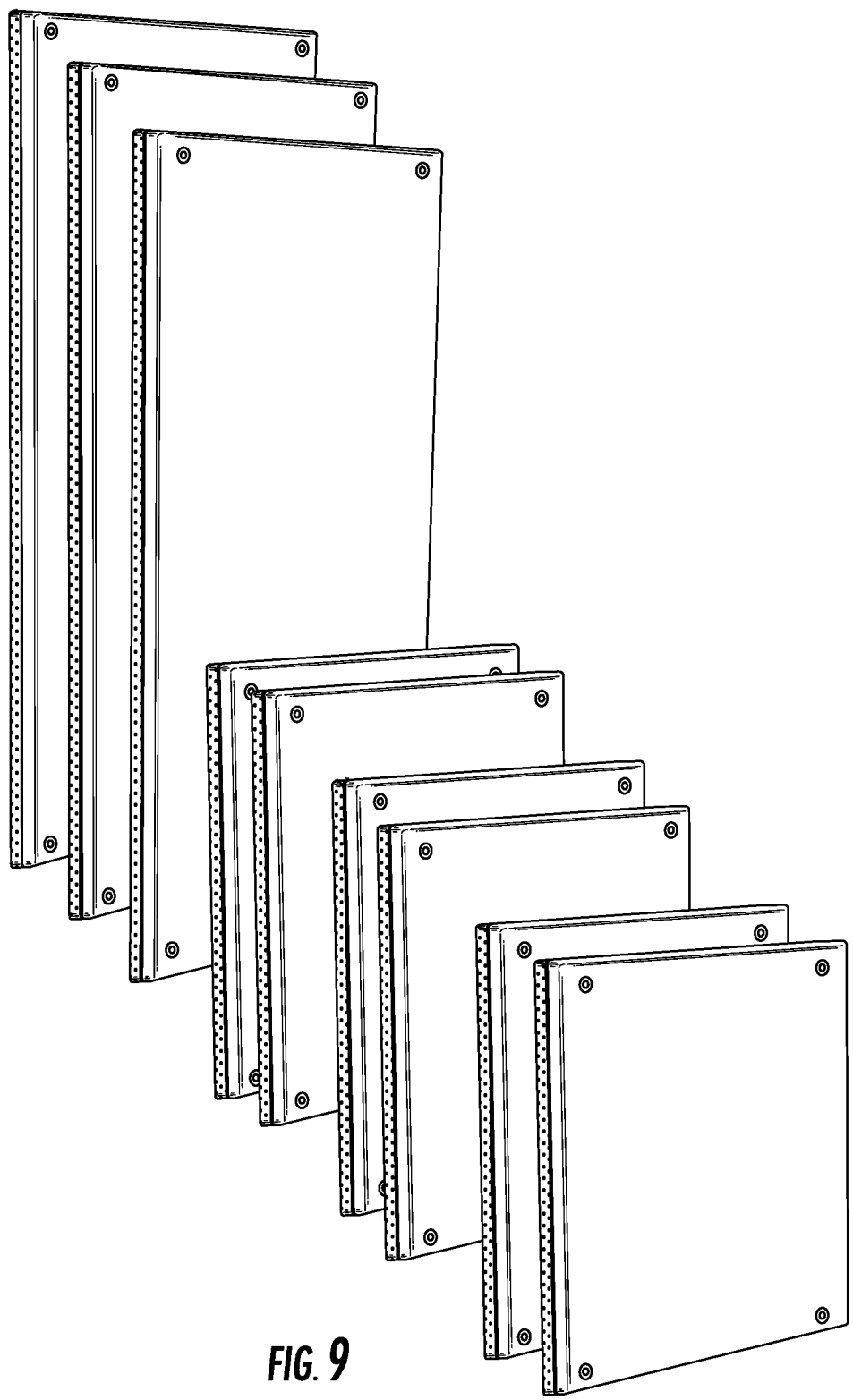
FIG. 9 illustrates various embodiments of acoustic panel systems formed with low-density substrate and through-grommet mounting arrangements.

Although various embodiments of a multi-layered cover 20 have been described, the hidden mounting structure 30 as described herein may be attached to and used with a cover 20 formed of only a single material. Similarly, it is to be understood that a multi-material cover 20 formed with front and rear panels 21, 23 as described herein may be used with mounting arrangements other than the hidden mounting structure 30, such as e.g. those prior mounting arrangements described with reference to FIGS. 1A-1C For example, an acoustic panel system 100 formed with a high density substrate and including a mounting arrangement comprising a mounting element inserted into a hardened edge of the substrate (such as, e.g. shown in FIG. 1B) may include a multi-material cover 20 according to any such embodiment disclosed herein As shown by the representative embodiments of FIG. 9, in some embodiments, acoustic panel systems 100 incorporating low density substrates and a multi-material cover 20 as described herein, may incorporate a through-grommet arrangement to mount the acoustic panel system 100. In addition to the improved multi-material cover 20 (as compared to the single material cover 20' or prior through-grommet low density substrate panel designs 10') the through-grommet embodiments illustrated in FIG. 9 also incorporate additional improvements over prior single-material through-grommet designs. In particular, instead of a 1.5 lbs. pcf or 1.65 lbs. pcf substrate, the low density substrate may be a custom 2 lbs. pcf, 2-inch substrate from CertainTeed, which offers improved acoustic characteristics. Furthermore, rather than the standard 7/16"×1" grommets used on prior designs 10', such as the embodiment of FIG. 1A, an acoustic panel system 100 as illustrated in FIG. 9 utilities 3/8" hole and 3/4" flange grommets so as to avoid puckering of the cover 20 around the grommet throughholes. Such improvements over the prior through-grommet design provide a more refined and visually appealing look to the acoustic panel system 100.

Example Acoustic Panel System 1

In one embodiment, the acoustic panel system 100 includes a hidden mounting structure 30 located along the rear surface 12 of the acoustic panel system 100. The first base 31 comprises a 2"×8" heavy weight nylon webbing strap (typically 3/32" thick), and is sewn on the inside surface of the rear panel 23. Next, a mounting element 33 comprising a silver or black metal grommet (3/8" hole, 3/4" flange) is punched through the second base 32, which comprises a 2"×7" strap heavy weight nylon webbing strap (typically 3/32" thick). The mounting element 33/second base 32 assembly is then sewed onto the external side of the rear panel 23 and into the first base 31. The mounting element 33 may comprise a grommet.

The substrate forming the acoustic panel system 100 measures 24"×48"×2", and comprises a 3 lbs. pcf fiberglass acoustic substrate material. The rear panel 23 comprises a nylon ripstop sailcloth (e.g., 70D Urethane Ctd *FR* Nylon Ripstop, Flame Retardant, 3/4 oz. UV Urethane Ctd-59/60"). The front panel 21 is formed of a different fabric material (e.g., Guilford of Maine 2100 FR701) than the material of the rear 23, so as to take advantage of the different acoustical and/or physical properties of different materials/fabrics. The Guilford fabric forming the front panel 21 is the most acoustically transparent fabric on the market, allowing the sound to be absorbed by the fiberglass substrate with no reflection. The sailcloth forming the rear panel 23 is less transparent but offers better low frequency absorption. Another benefit of the use of two different materials is that the acoustic panel system 100 transports better, without the Velcro effect that fabric acoustic panels/baffles typically have.

The cover 20 is designed, assembled and sewn in a manner that provides a tight covering of the substrate. To assemble the acoustic panel system 100, the cover 20 is first sewn into a "bag" configuration with one open end. The cover 20 is measured to a very tight tolerance in relation to the 24"×24"×2" or 24"×48"×2" fiberglass substrate (e.g., Owens Corning 703 3 #12"). The substrate is wrapped in a plastic sheet and then stuffed into the cover 20 "bag" through the opening. The plastic helps the substrate slide into the very tight bag and then the plastic is pulled out. Finally, the cover 20 "bag" is pulled tight, and the top seam is sewn. The interface between the front and rear panels 21, 23 of the cover 20 is unique. The edges of the rear panel are folded back in on themselves, which creates a dual-layer 'stripe' 22 without creating a bulge, as is typically seen in many conventional panel designs.

Example Acoustic Panel System 2

In one embodiment, the acoustic panel system 100 uses a custom 2 lbs. pcf, 2" substrate from CertainTeed which gives the acoustic panel system 100 a much more refined look than those prior panel designs made with 1.5 lbs. pcf or 1.65 lbs. pcf substrates. In this embodiment, the acoustic panel system 100 utilizes a 3/8" hole and 3/4" flange grommets as mounting elements 33 rather than the more common 7/16"×1" grommets, which results in far less puckering of the cover 20.

Similar to Embodiment 1 discussed above, the 2 lbs. pcf acoustic panel system 100 of Embodiment 2 comprises a rear panel 23 formed of a with nylon ripstop sailcloth and a front panel 21 formed of Guilford of Maine 2100 FR701, taking advantage of the acoustical and physical properties of both fabrics. The Guilford fabric is the most acoustically transparent fabric on the market, allowing the sound to be absorbed by the fiberglass substrate with no reflection. The sailcloth is less transparent but offers better low frequency absorption. Another benefit of utilizing two different fabrics is that the baffles transport or stack better, without the Velcro effect typically found between contacting surfaces of like fabric materials when all-fabric baffles are stacked for transport.

The acoustic panel system 100 of Embodiment 2 is designed, assembled and/or sewn in a manner that provides a tight covering of the substrate. First the cover 20 is sewn into a "bag" configuration with one open end. The cover is measured to a very tight tolerance in relation to the 24"×24"×2" or 24"×48"×2" CertainTeed 2 lbs., pcf, 2" fiberglass substrate. The substrate is wrapped in a plastic sheet and then stuffed into the bag—the plastic helps the board slide into the very tight bag and then the plastic is pulled out. Finally, the bag is pulled tight and the top seam is sewn. The seams 24 of the bag are unique, with the rear panel 23 being folded back in on itself along the sides, which creates a stripe 22 without creating bulges within the cover 20.

The 2 lbs. pcf substrate material acoustic system 100 of Embodiment 2 includes a through-grommet mounting arrangement rather than the hidden mounting structure 30 discussed above with reference to Embodiment 1. To increase mounting options, the acoustic panel system 100 of Embodiment 2 may include 4 grommets, located one in each corner, 2½" in from each side.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended to include one or more component or element, and is not intended to be construed as meaning only one.

Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

I claim:

1. An acoustic panel comprising:
a sound absorbing substrate, the sound absorbing substrate having a density of greater than 2 pounds per cubic foot (pcf) and less than 6 pounds pcf;
a cover defining an interior cavity configured to cover an exterior of the substrate, the cover comprising:
a front panel having an outer surface and an inner surface; and
a rear panel having an outer surface and an inner surface;
at least one mounting structure configured for mounting the acoustic panel, the at least one mounting structure comprising:
a first attachment portion, the first attachment portion attached to the rear panel along the edge of the inner surface of the rear panel;
a second attachment portion;
at least one mounting element;
the at least one mounting element attached to and extending outwards from an outer surface of the second attachment portion,
the second attachment portion and attached mounting element being attached to the outer surface of the rear panel at a location that overlies the location at which the first attachment portion is attached to the rear panel; and
at least one thread, the at least one thread extending along at least a portion of an outer periphery of the first attachment portion;
wherein the thread passes through the first attachment portion, a portion of the rear panel extending between an outer surface of the first attachment portion and an inner surface of the second attachment portion, and through the second attachment portion.

2. The acoustic panel of claim 1, wherein the first attachment portion and the second attachment portion comprise nylon straps.

3. The acoustic panel of claim 1, wherein the mounting element extends through at least a portion of the second attachment portion.

4. The acoustic panel of claim 3, wherein the mounting element comprises a grommet that extends through the second attachment portion from the outer surface of the second attachment portion to the inner surface of the second attachment portion.

5. The acoustic panel of claim 1, wherein no portion of the mounting element is in direct contact with the substrate.

6. The acoustic panel of claim 1, wherein the substrate is a fiberglass substrate.

7. The acoustic panel of claim 1, wherein the substrate is a 2-inch thick 3 pounds pcf substrate.

8. The acoustic panel of claim 1, wherein the mounting element comprises a D-ring.

* * * * *